United States Patent
Ruble et al.

(10) Patent No.: US 7,512,696 B1
(45) Date of Patent: *Mar. 31, 2009

(54) METHOD AND SYSTEM FOR IMPLEMENTING A CONNECTION BETWEEN WEB PARTS TO SEND OR RECEIVE DATA

(75) Inventors: B. Scott Ruble, Bellevue, WA (US); Daniel Cheung, Mercer Island, WA (US); Kelsey Allen Pedersen, Covington, WA (US); Greg S. Lindhorst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 705 days.

This patent is subject to a terminal disclaimer.

(21) Appl. No.: 10/461,113

(22) Filed: Jun. 13, 2003

(51) Int. Cl.
*G06F 15/16* (2006.01)
*G06F 3/048* (2006.01)
*G06F 3/00* (2006.01)

(52) U.S. Cl. .................. 709/230; 709/227; 715/804; 715/805; 719/312; 719/331

(58) Field of Classification Search .............. 709/219, 709/238, 227, 230; 715/804, 805; 719/312, 719/331
See application file for complete search history.

(56) References Cited

U.S. PATENT DOCUMENTS

| | | | |
|---|---|---|---|
| 5,749,083 A | 5/1998 | Koda et al. ................ 707/530 |
| 6,337,696 B1 * | 1/2002 | Lindhorst et al. ........... 715/763 |
| 6,529,936 B1 * | 3/2003 | Mayo et al. ................. 709/202 |
| 6,760,047 B2 * | 7/2004 | Hough et al. ............... 715/753 |
| 7,139,969 B1 * | 11/2006 | Ruble et al. ............. 715/500.1 |
| 7,281,252 B1 * | 10/2007 | Lindquist et al. ........... 719/332 |
| 2002/0118226 A1 * | 8/2002 | Hough et al. ............... 345/764 |
| 2003/0038836 A1 * | 2/2003 | Ronald et al. .............. 345/738 |
| 2003/0056024 A1 * | 3/2003 | Tlaskal et al. .............. 709/315 |

OTHER PUBLICATIONS

Chinese Office Action, dated Jul. 18, 2008, Application No. 2005 10116336.5, filed Oct. 14, 2005.

* cited by examiner

*Primary Examiner*—William C Vaughn, Jr.
*Assistant Examiner*—Kristie D. Shingles
(74) *Attorney, Agent, or Firm*—Merchant & Gould PC

(57) ABSTRACT

A Web Part connection runtime framework provides the architecture for Web Parts to connect and pass data between each other. The runtime framework provides a series of interfaces that a Web Part can implement to send or receive information from other connected Web Parts. The interfaces provided by the runtime framework allow for the connection of Web Parts on a server or client. A first Web Part is retrieved and connected to a second Web Part in response to a user selecting information to be passed from the first Web Part to the second Web Part. Subroutines of the connected Web Parts are fired signaling the Web Parts to pass data from one to another. Once the data is passed, the Web Part receiving data can be rendered while containing the passed data on the server or the client.

23 Claims, 12 Drawing Sheets

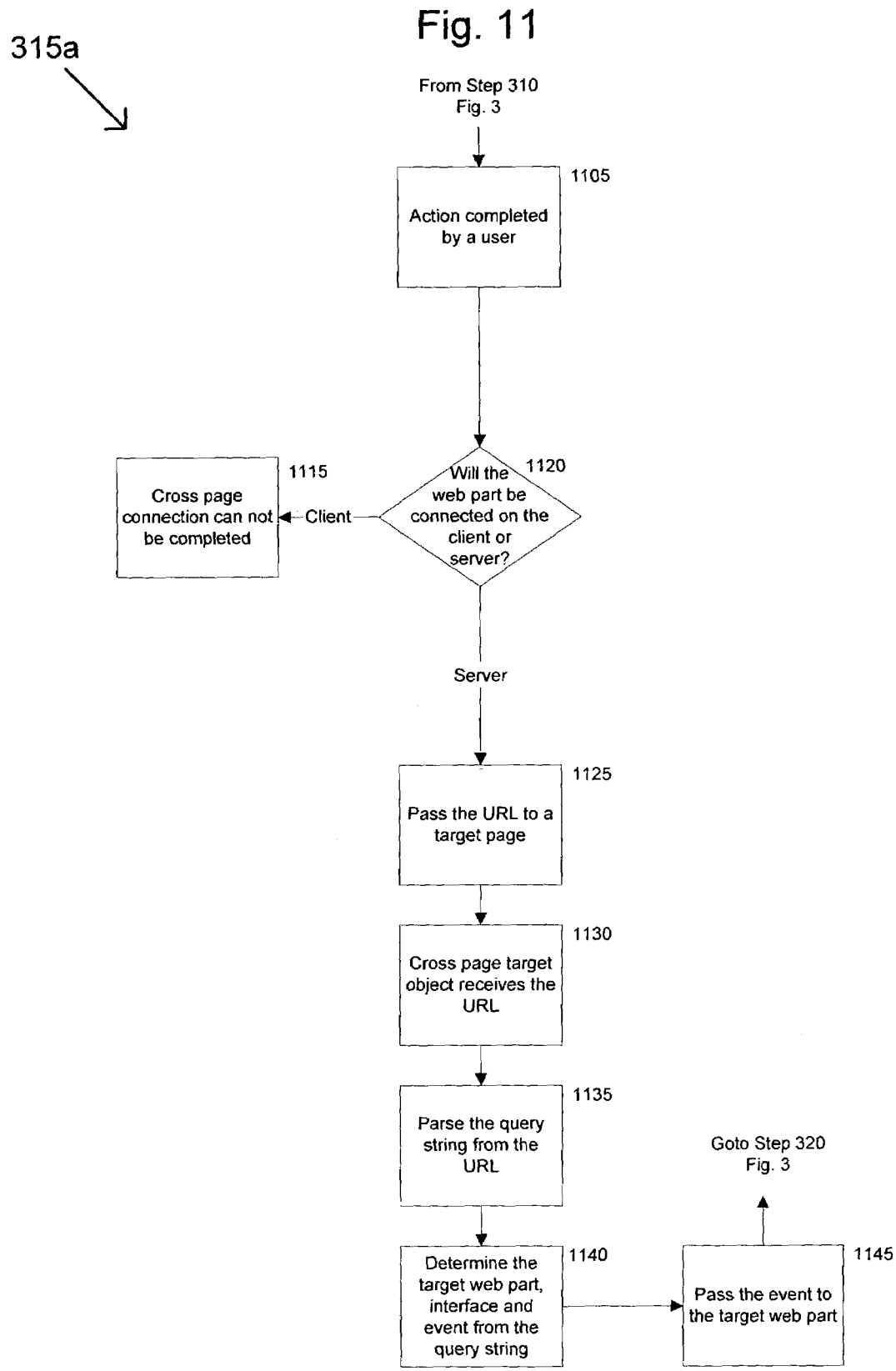

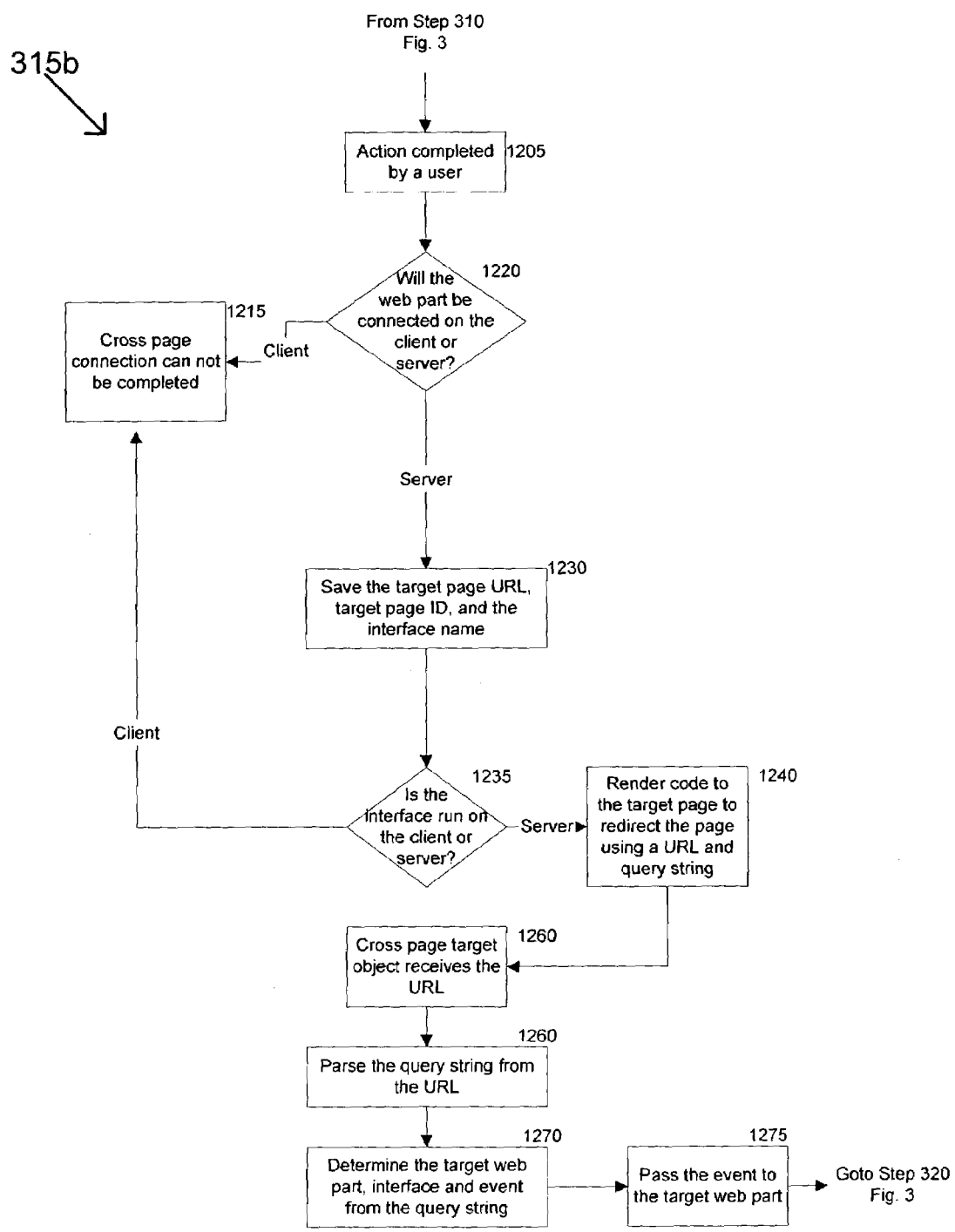

METHOD AND SYSTEM FOR IMPLEMENTING A CONNECTION BETWEEN WEB PARTS TO SEND OR RECEIVE DATA

FIELD OF THE INVENTION

The present invention relates to the field of content retrieval. In particular, the invention provides a framework to connect multiple Web Parts retrieved from a distributed computer network and to share information between the connected Web Parts.

BACKGROUND OF THE INVENTION

Web Parts are an encapsulation of functionality and information that can be dropped onto a web page as a unit. By themselves, Web Parts are "islands" of functionality and information which have a fixed amount of value. For example, a page could have two Web Parts, a list of team members and a list of activities for individuals on the team. The value each Web Part provides to a user viewing the Web Parts is limited to the distinct information the Web Part presents. However, much greater value can be achieved by connecting the Web Parts together to support communication or interaction between the connected Web Parts. In the above example, the two Web Parts could be connected in a manner which allows the team members' Web Part to filter information from the activities' Web Part, whereby only the activities of team members are retrieved from the activities' Web Part.

Prior Web Part connection systems allowed Web Parts to share information between one another by hard wiring the connection between the two Web Parts. The Web Parts could share information if the two Web Parts had intimate knowledge of one another. This typically required that the same software developer develop the code for these Web Parts. These prior systems allowed for limited flexibility in sharing information between Web Parts. Furthermore, these prior systems did not allow end users to connect Web Parts, which the end user created, to suit individual needs.

Yet another prior Web Part connection system developed a limited number of methods to allow Web Parts to connect to one another and to pass information. This prior system passed an object to a client. The object provided a series of utility-type methods for creating and converting URL code to allow Web Parts to be connected together. However, this system still required that the Web Parts have intimate knowledge of one another before connecting and passing information. Furthermore, an end user relied on developers to create Web Parts which could be connected and pass information among one another. Additionally, developers who created Web Parts did not adhere to any standard method for creation. The failure to adhere to a standard limited the ability to share information between Web Parts created by different developers.

In view of the foregoing, there is a need in the art for a method to allow end users to connect Web Parts via a graphical user interface instead of relying on code written specifically for each connection. This greatly increases the flexibility of Web Parts and puts control in the hands of the end user. In addition, there is a need in the art for a method to connect Web Parts that comply with a standard so that Web Parts not developed by the same person can be connected. Furthermore, there is a need in the art for the ability to connect a Web Part residing on one page to a Web Part residing on a different page.

SUMMARY OF THE INVENTION

A Web Part connection framework provides methods and architecture for Web Parts to connect and pass data between one another. The Web Part connection framework provides a series of interfaces that a Web Part can implement to send or receive information from other connected Web Parts. The interfaces provided by the runtime framework allow for the connection of Web Parts on a server or client.

A Web Part is an encapsulation of functionality and information that can be dropped onto a web page as a unit. By itself, a Web Part is an island of functionality and information which has a fixed amount of value. The value each Web Part provides is typically limited to the distinct information presented by that Web Part. However, greater value can be achieved by "connecting" the Web Parts together to enable communication between the Web Parts. Web Parts are typically connected through the use of interfaces.

An interface typically encompasses a grouping of events relevant to a specific item, such as a row in a list of data. Interfaces form a communication bus between Web Parts. A Web Part can present interfaces to one or more connected Web Parts to make the connected Web Parts perform an action, such as passing data. The interface can be implemented on the client-side, the server-side, or both. Interfaces are typically paired. Web Parts can communicate with one another by implementing compatible ends of interface pairs. If the ends of the interfaces are not compatible, a transformer can be inserted between the incompatible interface ends to provide compatibility and allow for the transfer of data between the Web Parts.

For one aspect of the present invention, a Web Part connection program can connect multiple Web Parts by accepting a Web Part into the Web Part connection program. The Web Part connection program can connect the Web Part to one or more other Web Parts on a client or server. The Web Part connection program typically calls a series of subroutines on the Web Parts which are connected. The subroutines can include initialization methods as well as subroutines which instruct the connected Web Parts to share data. Once the Web Parts have shared data, the Web Parts can be disconnected and rendered for presentation on a monitor.

For another aspect of the present invention, the Web Part connection program can connect Web Parts on a client computer by generating a Web Part on the server. The Web Part connection program typically connects the generated Web Part to one or more additional Web Parts on the server side. The program can then render the connected Web Parts to the client, where the Web Part connection program calls a series of subroutines for the connected Web Parts.

BRIEF DESCRIPTION OF DRAWINGS

For a more complete understanding of exemplary embodiments of the present invention and the advantages thereof, reference is now made to the following description in conjunction with the accompanying drawings in which:

FIG. 11 is a flowchart illustrating a process for connecting Web Parts, having a hyperlink, across more than one page in accordance with an alternate exemplary embodiment of the present invention; and FIG. 12 is a flowchart illustrating a process for connecting Web Parts across more than one page in accordance with an alternate exemplary embodiment of the present invention.

DETAILED DESCRIPTION OF THE EXEMPLARY EMBODIMENTS

Figure 1:
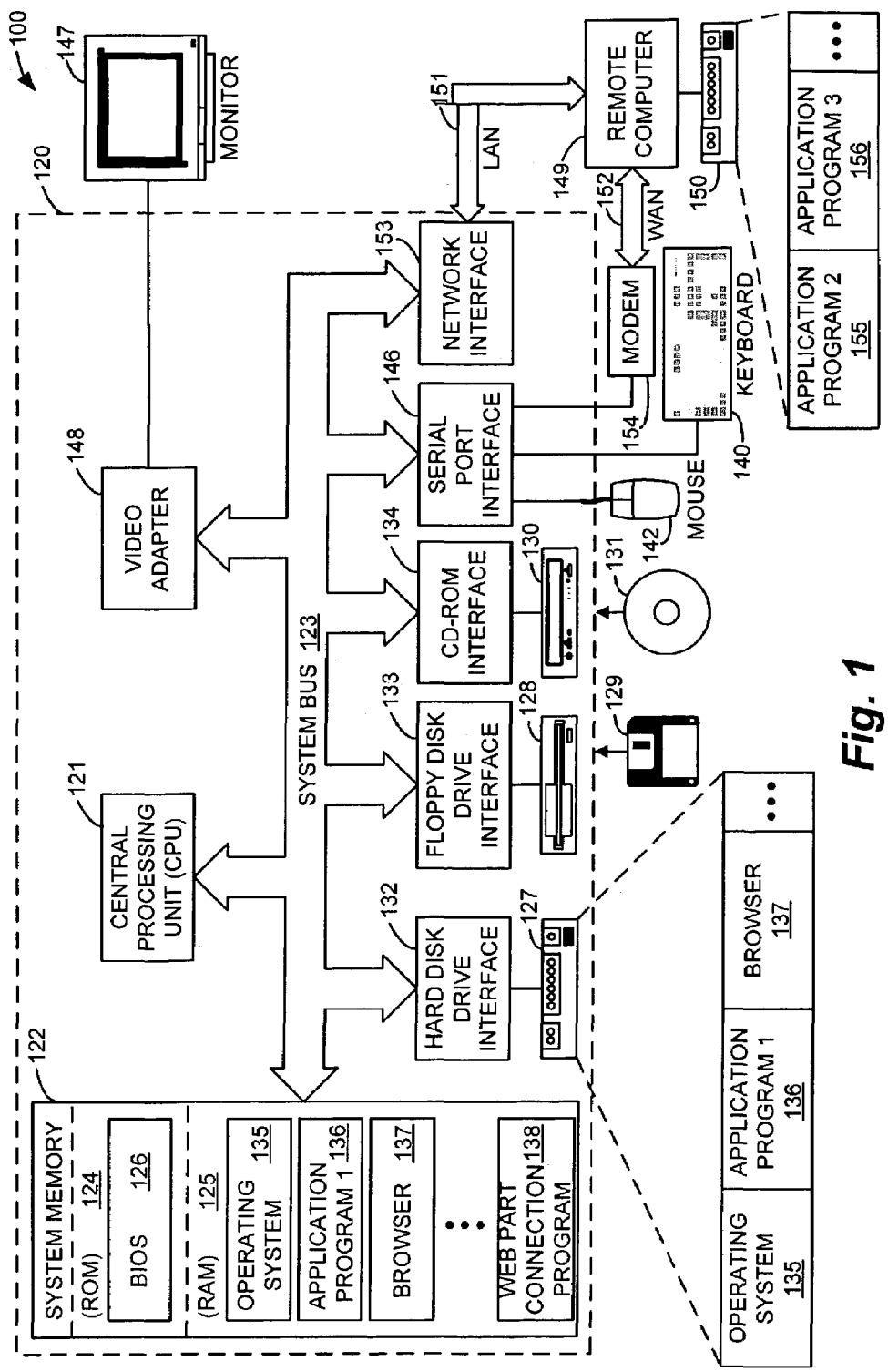
FIG. 1 is a block diagram illustrating an exemplary operating environment for implementation of various embodiments of the present invention.

The present invention supports a computer-implemented method and system for evaluating multiple Web Parts, determining the compatibility of the Web Parts, and generating a connection between compatible Web Parts. Exemplary embodiments of the invention can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Exemplary embodiments of the present invention include a computer program which embodies the functions described herein and illustrated in the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated description in the application text, for example. Therefore, disclosure of a particular set of program code instructions is not considered necessary for an adequate understanding of how to make and use the present invention. The inventive functionality of the claimed computer program will be explained in more detail in the following description is disclosed in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 is a block diagram illustrating an exemplary operating environment 100 for implementation of various embodiments of the present invention. Those skilled in the art will appreciate that FIG. 1 and the associated discussion are intended to provide a brief, general description of one exemplary embodiment of computer hardware and program modules, and that additional information is readily available in appropriate programming manuals, user's guides, and similar publications.

The exemplary operating environment 100 illustrated in FIG. 1 includes a general-purpose computing device that can be in the form of a conventional personal computer 120. As shown in FIG. 1, the personal computer 120 operates in a networked environment with logical connections to a remote server 149. The logical connections between the personal computer 120 and the remote server 149 are represented by a local area network 151 and a wide area network 152. Those of ordinary skill in the art will recognize that in this client/server configuration, the remote server 149 may function as a file server or computer server.

The personal computer 120 includes a processing unit 121, such as a "PENTIUM" microprocessor manufactured by Intel Corporation of Santa Clara, Calif. The personal computer also includes system memory 122, including read only memory (ROM) 124 and random access memory (RAM) 125, which is connected to the processor 121 by a system bus 123. An exemplary embodiment of the computer 120 utilizes a basic input/output system (BIOS) 126, which is stored in the ROM 124. Those skilled in the art will recognize that the BIOS 126 is a set of basic routines that helps to transfer information between elements of the personal computer 120.

Those skilled in the art will also appreciate that the present invention may be implemented on computers having other architectures, such as computers that do not use a BIOS 126, and those that utilize other types of microprocessors for a processing unit 121.

Within the personal computer 120, a local hard disk drive 127 is connected to the system bus 123 via a hard disk drive interface 132. A floppy disk drive 128, which is used to read or write to a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134.

A user can enter commands and information into the personal computer 120 by using input devices, such as a keyboard 140 and/or pointing device, such as a mouse 142, which are connected to the system bus 123 via a serial port interface 146. Other types of pointing devices (not shown in FIG. 1) include track pads, track balls, digitizer pens, head trackers, data gloves, and other devices suitable for positioning a cursor on a monitor 105. The monitor 105 or other kind of display device is connected to the system bus 123 via a video adapter 148.

As depicted in FIG. 1, a number of program modules can be stored on ROM 124, RAM 125, hard disk 127, floppy disk 129, or CD-ROM/DVD disk 131, such as an operating system 135, an application program module 136, a browser 137, and a Web Part connection program module 138. Program modules typically include routines, sub-routines, programs, objects, components, data structures, etc., which perform particular tasks or implement particular abstract data types.

The remote server 149 in this networked environment is connected to a remote memory storage device 150. This remote memory storage device 150 is typically a large capacity device such as a hard disk drive, CD-ROM or DVD drive, magneto-optical drive or the like. Those skilled in the art will understand that program modules, such as an application program module 136, are provided to the remote server 149 via computer-readable media. The personal computer 120 is connected to the remote server 149 by a network interface 153, which is used to communicate over a local area network (LAN) 151.

In some embodiments, the personal computer 120 is also connected to the remote server 149 by a modem 154, which is used to communicate over a wide area network (WAN) 152, such as the Internet. The modem 154 is connected to the system bus 123 via the serial port interface 146. The modem 154 also can be connected to the public switched telephone network (PSTN) or community antenna television (CATV) network. Although illustrated in FIG. 1 as external to the personal computer 120, those of ordinary skill in the art can recognize that the modem 154 may also be internal to the personal computer 120, thus communicating directly via the system bus 123. It is important to note that connection to the remote server 149 via both the LAN 151 and the WAN 152 is not required, but merely illustrates alternative methods of providing a communication path between the personal computer 120 and the remote server 149.

Those skilled in the art will appreciate that program modules, such as the operating system 135, the application program 136, the browser 137, and the Web Part connection program module 138 can be provided to the personal computer 120 via computer-readable media. In exemplary embodiments of the operating environment 100, the computer-readable media can include the local or remote memory storage devices, which may include the local hard disk drive 127, floppy disk 129, CD-ROM/DVD 131, RAM 125, ROM 124, and the remote memory storage device 150. In some exemplary embodiments of the personal computer 120, the local hard disk drive 127 is used to store data and programs.

Although other elements of the personal computer 120 and the operating environment 100 in general are not shown, those of ordinary skill in the art will appreciate that such components and the interconnection between them are known. Accordingly, additional details concerning the elements of the personal computer 120 and the operating environment 100 in general need not be disclosed in connection with the present invention for it to be implemented by those of ordinary skill in the art.

Figure 2:
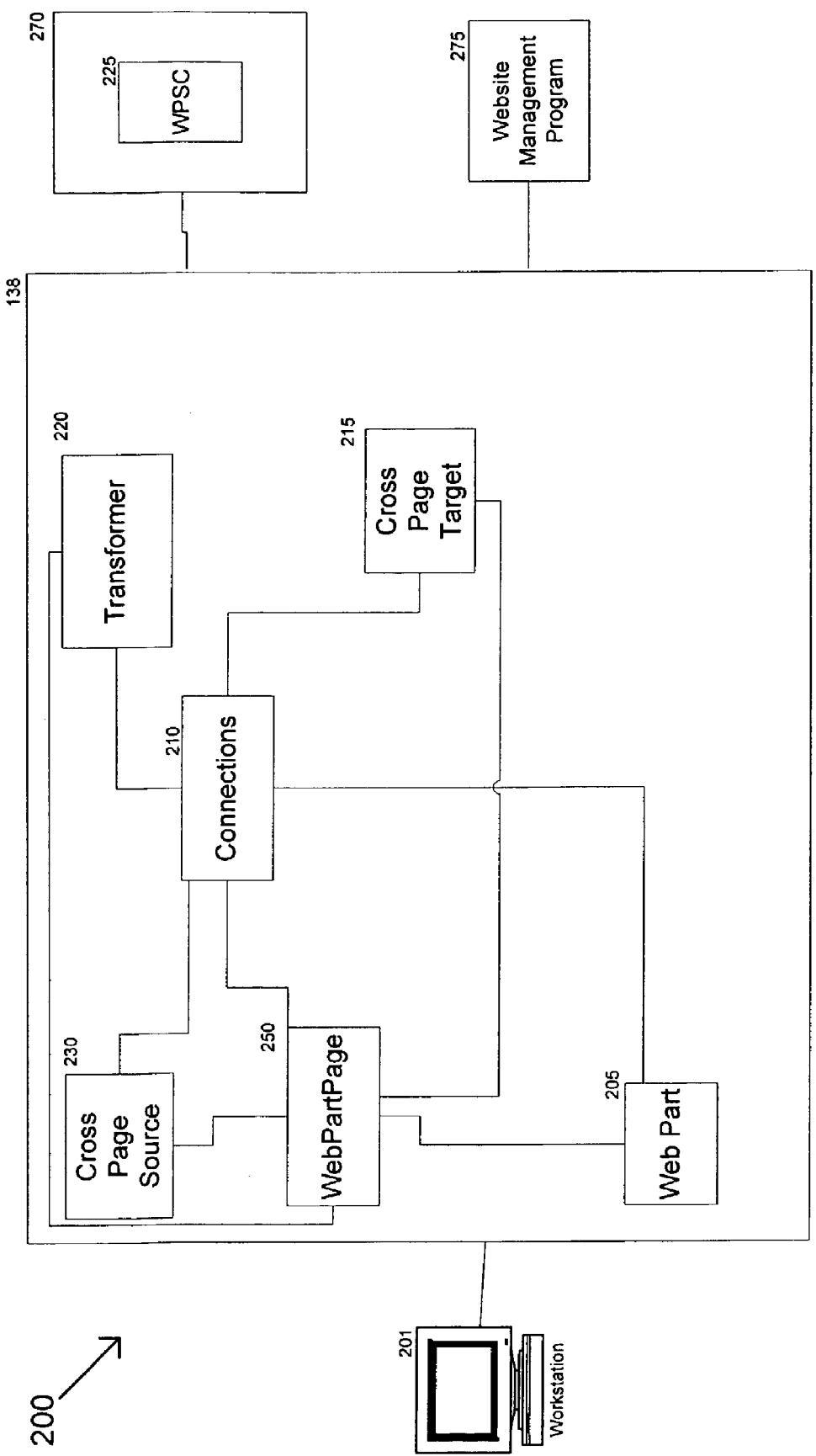
FIG. 2 is a block diagram of a Web Part connection program environment constructed in accordance with an exemplary embodiment of the present invention.

FIG. 2 is a block diagram illustrating a Web Part connection system 200, constructed in accordance with an exemplary embodiment of the present invention. Now referring to FIGS. 1 and 2, the exemplary Web Part connection system 200 comprises a workstation 201 running a Web Part connection program 138, a client computer 270, and a website management program 275. The Web Part connection program 138, can reside either at a local computing environment, such as the workstation 201, or at a remote location, such as the remote server 149. The workstation 201 is communicably attached via a distributed computer network to the Web Part connection program 138, the client computer 270, and the website management program 275. In one exemplary embodiment, the workstation 201 is a personal computer and the Web Part connection program 138 resides in the personal computer.

The client 270 is communicably attached via a distributed computer network to the Web Part connection program 138, and the workstation 201. In one exemplary embodiment, the client 270 is a personal computer. The exemplary client computer 270 comprises a Web Parts service component object 225 ("WPSC"). The WPSC 225 is a JavaScript object that is placed on the client 270 by a WebPartPage object 250. The WPSC 225 controls a client-side Web Part-to-Web Part connection. When Web Parts are connected, information can be passed back and forth or shared between the connected Web Parts. The WPSC 225 can also receive events fired by the client side interfaces of Web Parts and route the events to the appropriate event handlers.

An interface typically includes a grouping of events relevant to an item, such as a row in a list of a Web Part. The interface can permit a Web Part to receive or pass information to or from other Web Parts by forming a communication bus between the Web Parts. The interfaces can be paired together to allow for a connection between Web Parts. Interfaces having compatible ends can allow information to pass between connected Web Parts. Web Parts having interfaces which do not have compatible ends can pass information to one another through the use of a transformer. The transformer can generate a code to the connected incompatible Web Parts to define how one item, such as a row, is converted to another, such as a cell.

The exemplary website management program 275 is communicably attached via a distributed computer network to the Web Part connection program 138, and the workstation 201. The website management program 275 can reside either at a local computing environment, such as the workstation 201, or at a remote location, such as the remote server 149. The website management program 275 allows a user to design, create, or modify a new or existing website. The website management program 275 also allows for the connection of Web Parts from one or more pages.

The exemplary Web Part connection program 138 comprises a Web Part object 205, a connections object 210, a cross page target object 215, a transformer object 220, a cross page source object 230, and the WebPartPage object 250. The Web Part object 205, is an ASP.Net custom web form control that stores Web Parts selected by or available to a user. Web Parts are an encapsulation of functionality and information that can be dropped onto a web page as a unit. One example of a Web Part is a list of team members on a page. The WPC program 138 can also generate a transformer to be placed between two Web Parts which have incompatible interfaces.

The connections object 210 holds references to the interfaces and interface properties for each connection. Interface properties provide information related to the compatibility of the associated interface to other interfaces. In one exemplary embodiment, interface properties include: the name of the interface; the type of interface; the number of connections the interface can support; a description of the interface; and the object which generated the interface. The connections object 210 also evaluates connections for errors and notifies Web Parts when they are connected.

The cross page target object 215 allows interfaces to communicate across pages without any special logic. The cross page target object 215 exists on the target page. When Web Parts connect and pass data, the Web Part passing the data is the source Web Part and the Web Part receiving the data is the target Web Part. If the connected Web Parts are on different pages, the page on which the source Web Part is found is the source page. Conversely, the page on which the target Web Part is found is the target page. Each target Web Part can receive data from more than one source Web Part. Also, a source Web Part can provide data to more than one target Web Part. The cross page target object 215 parses the query string of the uniform resource locator ("URL") string passed from the source page. The cross page target object 215 also locates the target Web Part, the interface connected to the target Web Part and the event attached to the target Web Part. The cross page target object 215 can raise the event to the appropriate Web Part on the target page.

The transformer object 220 defines how one item, such as a row, is converted to another item, such as a cell. A transformer object is typically needed when the two connected Web Parts are not compatible. In one exemplary embodiment, the transformer object 220 is server-side code that is instantiated by the WebPartPage object 250. If transformer logic is needed on the client 270, the transformer object 220 will render the appropriated code to the client 270 to complete the transformations.

The cross page source object 230 makes cross page communication of Web Part data possible without the need for physical hyperlinks in the page. The cross page source object 230 resides on the source page. The cross page source object 230 hides the creation and syntax of the URL from the Web Part. The cross page source object 230 can determine if the interface connected to it is to be run on the workstation 201.

The WebPartPage object 250 checks the hidden fields on the page from which the Web Parts are taken, to determine if the hidden field values are correct. A hidden field does not render visibly in the browser 137, but its properties can be controlled by the Web Parts connection ("WPC") program module 138. The hidden field acts as a repository for any page-specific information that is stored directly in the page. In one exemplary embodiment, the hidden field stores a single variable in the hidden field value property which designates the hidden field functionality. The variable is added to the page by the WPC program module 138. The WebPartPage object 250 also generates the connections object 210.

Figure 3:
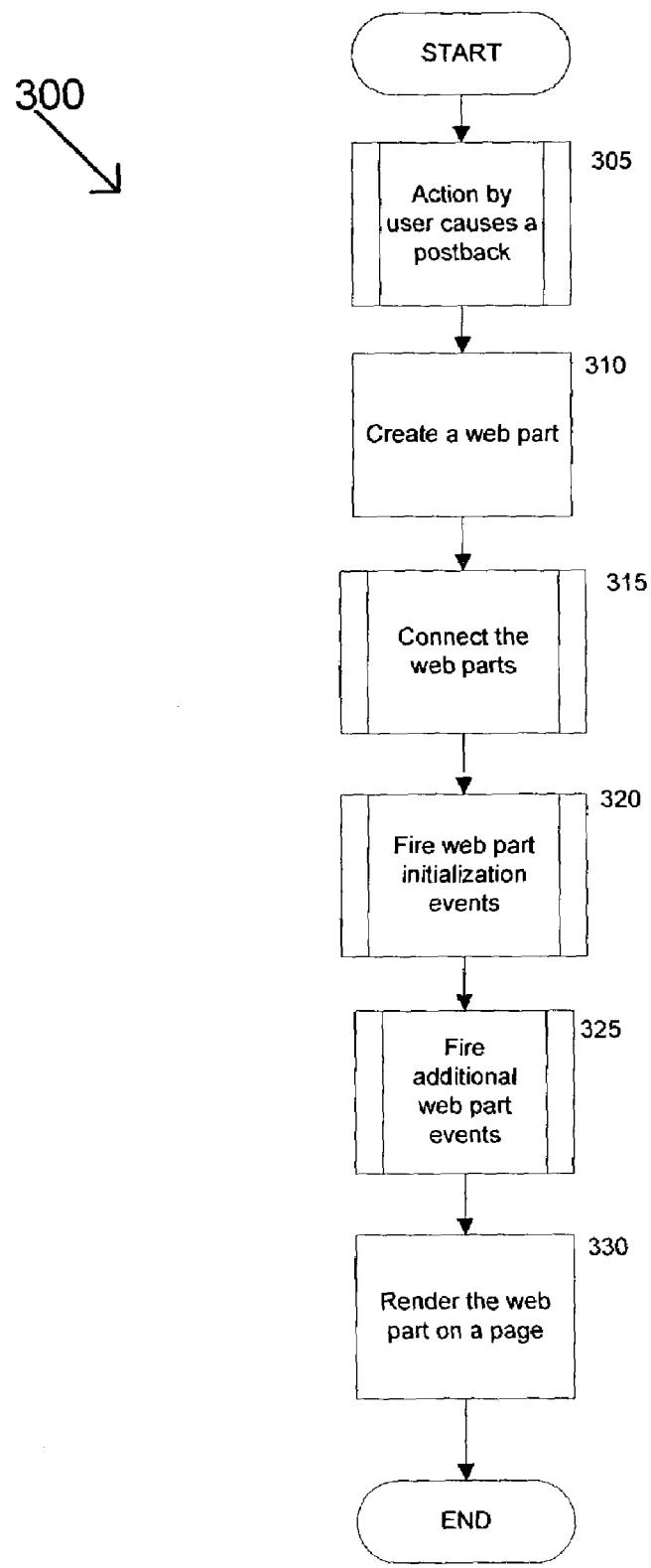
FIG. 3 is a flowchart illustrating a process for instantiating a Web Part so that information may be passed between the Web Parts on a server in accordance with an exemplary embodiment of the present invention.

FIGS. 3-12 are logical flowchart diagrams illustrating the computer-implemented processes completed by exemplary methods for instantiating a Web Part so that information may be passed between the Web Parts. FIG. 3 is a logical flowchart diagram presented to illustrate the general steps of an exemplary process 300 for generating and instantiating Web Parts so that information may be passed between the Web Parts on a page(s) maintained by a computer, such as a server 149 or client 270, within the operating environment of the exemplary Web Part connection system 200 of FIG. 2.

Now referring to FIGS. 1, 2, and 3, the exemplary method 300 begins at the START step and proceeds to step 305, in which a user action causes a postback. In one exemplary embodiment, the user action causing a postback includes the user selecting a record in the Web Part by completing a mouse button down operation using the mouse 142. The click-action of the mouse 142 typically causes the browser program 137 to transmit a post back to the server 149. The index of the record selected by the user is passed back to the server 149.

In step 310, the system 200 initiates a Web Part creation phase. In one exemplary embodiment, Web Part creation phase provides a standard process used by ASP.net and the Web Part connection program 138 for creating Web Parts. One exemplary method for creating a Web Part typically includes retrieving a Web Part template from the WPC program 138. Next, data can be inserted into the template, the data corresponding to the data to be contained in the Web Part. A reference to subroutines in the WPC program 138 is added to the Web Part template. An output path, designating where the Web Part will be located on a web page, is inserted into the Web Part template. A name and version number for the Web Part can be inserted into the Web Part template. Code is written which defines the rendering of the Web Part. Finally, a "build Web Part" option can be selected from the Web Part template to build the Web Part.

Web Parts are an encapsulation of functionality and information that can be dropped onto a web page as a unit. By themselves, Web Parts are "islands" of functionality and information which have a fixed amount of value. For example, a page could have two Web Parts, a list of team members and a list of activities for individuals on the team. The value each Web Part provides to a user viewing the Web Parts is limited to the distinct information the Web Part presents. However, much greater value can be achieved by connecting the Web Parts together to support communication or interaction between the connected Web Parts. In the above example, the two Web Parts could be connected in a manner which allows the team members' Web Part to filter information from the activities' Web Part, whereby only the activities of team members are retrieved from the activities' Web Part.

Web Part connections are completed in step 315. Connecting Web Parts provides a communication pathway allowing for the passing of data between the connected Web Parts. One Web Part is connected to another Web Part by determining if the Web Parts have compatible interfaces. Interfaces are typically compatible if the type of data being passed from one Web Part is the same as the type of data which can be received by the other Web Part. In one exemplary embodiment, data types include: cells, rows, fields, and lists.

In step 320, the Web Parts fire initialization events. Firing initialization events allows an initial set of information to be passed from a Web Part to other Web Parts and transformers that are connected to the Web Part. The initial set of information can include the form of the data which will be passed by the Web Part, including a field, a row, a cell, or a list. The Web Parts fire main events in step 325. Firing the main events allows the Web Part to pass the data which is to be shared between the Web Parts, to other connected Web Parts. A main event can include a pass data subroutine. The pass data subroutine can signal a source Web Part to pass a piece of data or a set of data from the source Web Part to the target Web Part. Once the source Web Part receives the signal from the pass data subroutine, the source Web Part can pass the data to the target Web Part.

In step 330, the Web Parts that have been connected are rendered to the client 270. The Web Parts that had data passed to them will be rendered with the data received. In one exemplary embodiment, the Web Part rendering phase of step 330 is a standard Web Part rendering process. The rendering process typically includes the ASP.net performing it pre-rendering routines. Then, the states of the Web Parts on the page are saved and the Web Parts are rendered for presentation at the client 270. The process 300 continues to the END step. The tasks completed in steps 305, 315, 320, and 325 are described in more detail below in connection with FIGS. 4, 5, 6, and 7.

Figure 4:
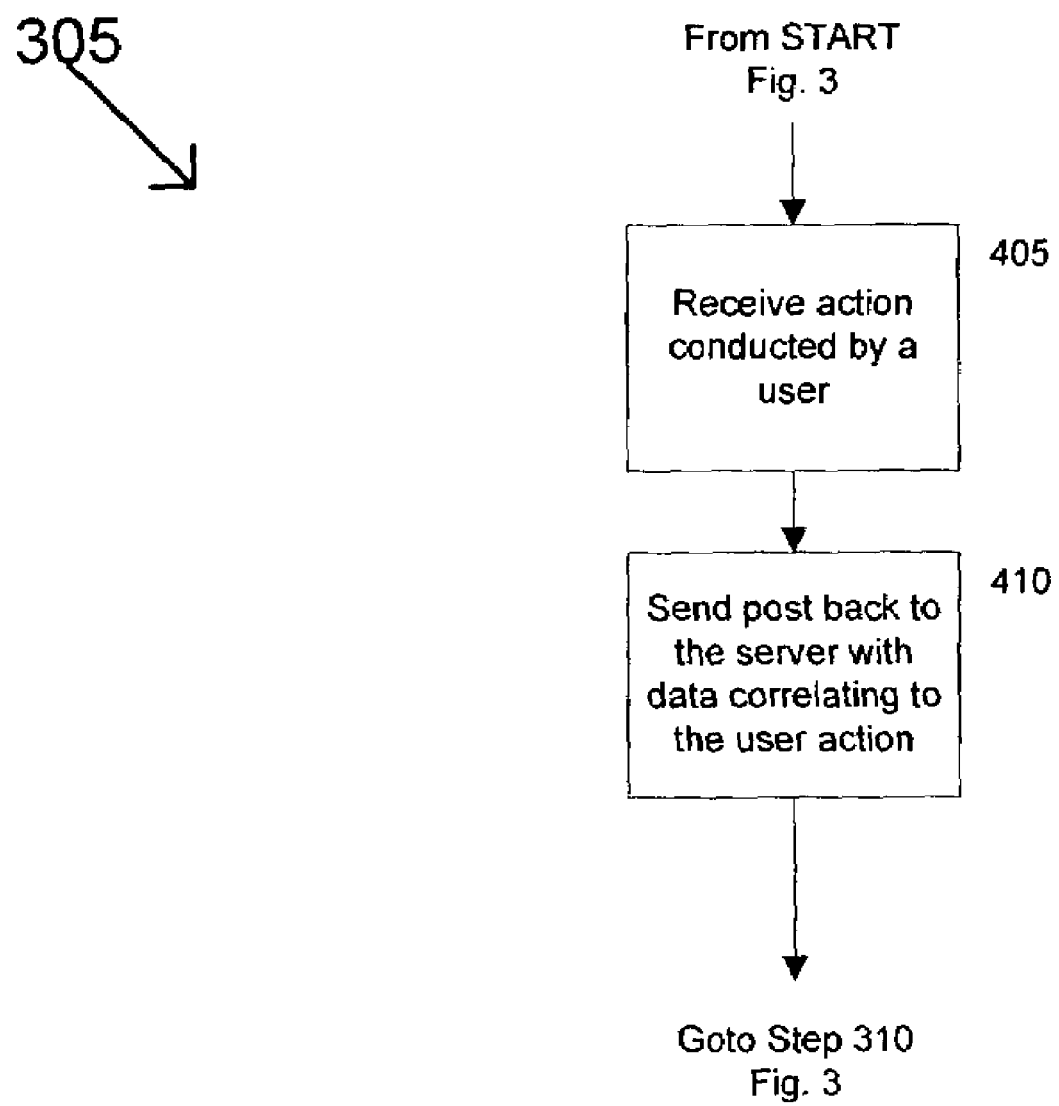
FIG. 4 is a flowchart illustrating a process for selecting a record from a Web Part in accordance with an exemplary embodiment of the present invention.

FIG. 4 is a logical flowchart diagram illustrating an exemplary computer-implemented method for generating a postback in response to a user action as completed by step 305 of FIG. 3. Referencing FIGS. 1, 2, and 4, the exemplary method 305 begins with a user completing a user action in step 405. In one exemplary embodiment, the user completes a user action by selecting a record in the Web Part. For example, the user can select a customer from a customer list. The selection causes a post back to be sent to the server 149 in step 410. The post back can include an index detailing which record the user selected. The process 305 continues to step 310 of FIG. 3.

Figure 5:
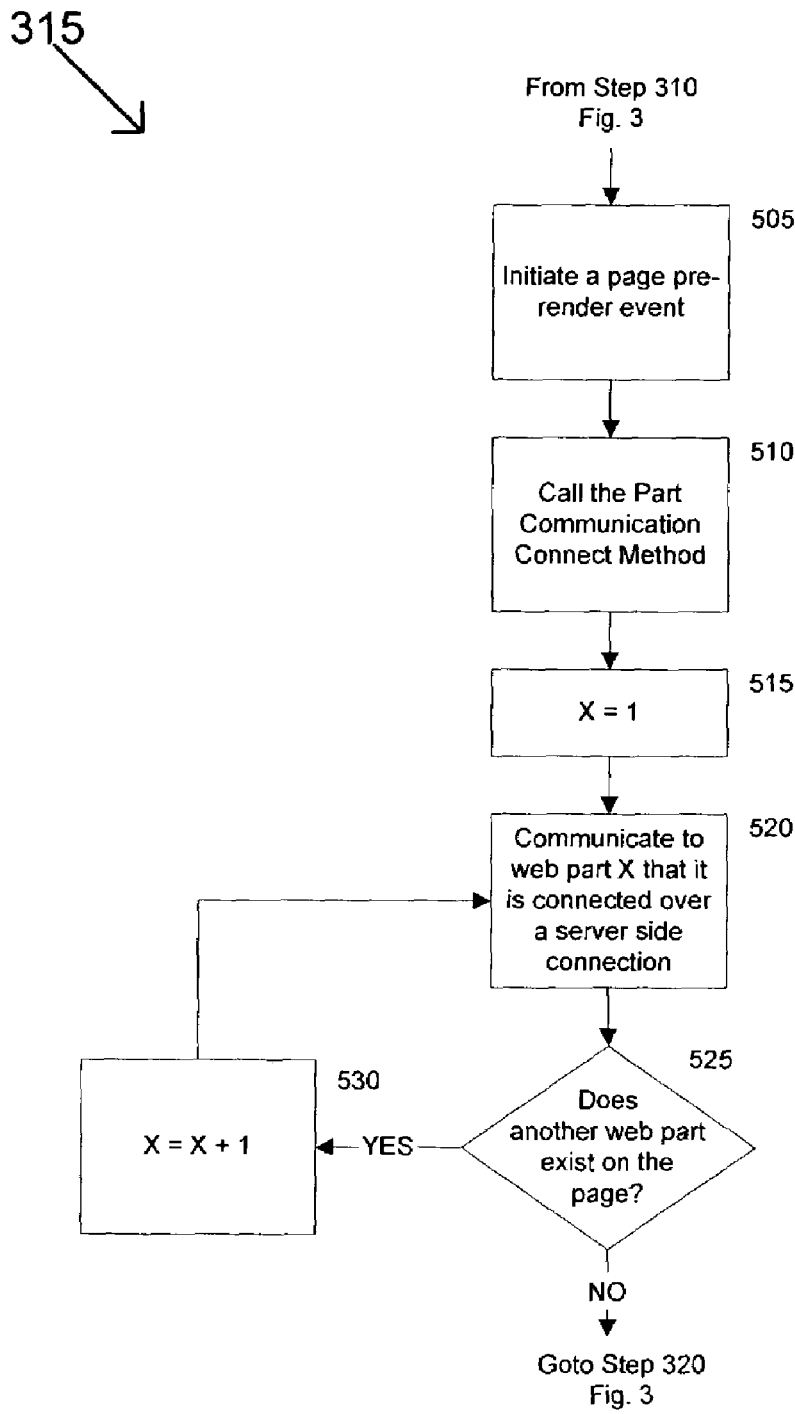
FIG. 5 is a flowchart illustrating a process for connecting Web Parts to one another so that data may be passed between the connected Web Parts in accordance with an exemplary embodiment of the present invention.

FIG. 5 is a logical flowchart diagram illustrating an exemplary computer-implemented method for connecting a first and second Web Part so that data may be shared between the Web Parts as completed by step 315 of FIG. 3. Referencing FIGS. 1, 2, and 5, the exemplary method 315 begins with a page pre-render event being conducted by the WebPartPage object 250 in step 505. In one exemplary embodiment, the WebPartPage object 250 hooks into a page pre-render event in the WPC program 138 before a pre-render event is called on any Web Part on the page.

In step 510, the Web Parts are connected by the connections object 210. The connections object 210 retrieves the Web Parts from the Web Part object 205. The connections object 210 connects the Web Parts by calling a part communication connect method on the event handlers in the Web Parts. The event handler signals the type of data which may be received by the target Web Part, for example, a row, a list, or a cell. The connections object 210 calls a part communication connect method on each of the connected Web Parts. The part communication connect method connects the Web Parts via a specific interface. The part communication connect method passes both ends of the connection information to the Web Parts. The connection information typically contains information about which interface is used to connect the Web Parts. The connection information can also contain information telling one Web Part about the Web Part it is connected to. The connection information can also include the interface used by the other Web Part to create the connection and communication pathway. Additionally, the communication information can tell the Web Part whether the connection between the Web Parts should run on the server-side or the client-side. The Web Part does not typically send a return value. In one exemplary embodiment, the part communication connect method is only called once for each of the connected Web Parts. Once the connections object 210 connects the Web Parts, the Web Parts implement an interface pair connecting the Web Parts. In one exemplary embodiment, the Web Parts build the interface pair by firing server side events.

In step 515, a counter variable, X, is set equal to one. The connections object 210 communicates to Web Part X that it is connected over a server side connection in step 520. In step 525, an inquiry is conducted to determine if another Web Part exists on the page. If so, the "YES" branch is followed to step 530, where the counter variable, X, is incremented by one. The process 315 returns to step 520, where the connections object 210 communicates with the next Web Part on the page. If no other Web Parts are on the page, the "NO" branch is followed to step 320 of FIG. 3.

Figure 6:
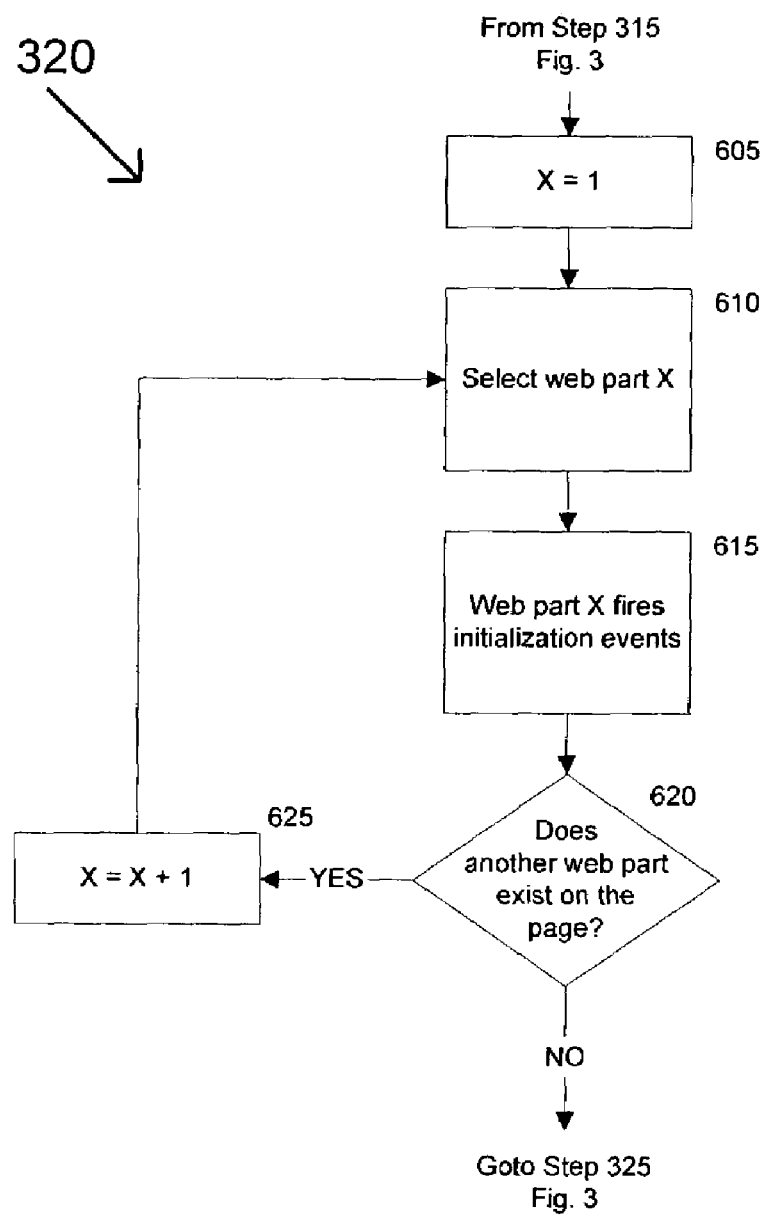
FIG. 6 is a flowchart illustrating a process for instructing Web Parts to fire initialization events in accordance with an exemplary embodiment of the present invention.

FIG. 6 is a logical flowchart diagram illustrating an exemplary computer-implemented method for instructing Web Parts to fire initialization events as completed by step 320 of FIG. 3. Now referring to FIGS. 1, 2, and 6, the exemplary method 320 begins with a counter variable, X, being set equal to one in step 605. Web Part X is selected in step 610 by the WebPartPage object 250.

In step 615, Web Part X fires its initialization events. The connections object 210 induces the Web Parts to fire initialization events by calling the part communication init method. The part communication init method is accomplished by the connections object 210 sending a signal to each connected Web Part. The connected Web Parts then fire events associated with initialization tasks. Typically, the connected Web Parts do not send a return value to the connections object 210. The completion of initialization tasks typically prepares the Web Parts or allows the Web Parts to pass data between the Web Parts. In one exemplary embodiment, the part communication init method is called once for each Web Part connected to another Web Part over a server-side connection. In one exemplary embodiment, an initialization event is any event whose method name includes the suffix ".init" and triggers an initialization operation. The initialization event passes various Web Part initialization parameters to the connected Web Parts, including the type of data which will be passed between the connected Web Parts and the location of the Web Part. For example, a source Web Part containing cells of data can have an initialization event which passes the name of the source Web Part, the name of the cell data to be passed to the target Web Part, and the type of interface used by the source Web Part to connect to the target Web Part. Likewise, a source Web Part containing rows of data to be passed to other Web Parts can have an initialization event which passes the name of the source Web Part, the name of the row data to be passed to the target Web Part, and the type of interface used by the source Web Part to connect to the target Web Part. The data types can include fields, lists, rows, and cells.

In step 620, an inquiry is conducted to determine if another Web Part exists on the page. If so, the "YES" branch is followed to step 625, where the counter variable, X, is incremented by one. The process 320 then returns to step 610 for the selection of the next Web Part. If no other Web Part remains to be selected, the "NO" branch is followed to step 325 of FIG. 3.

Figure 7:
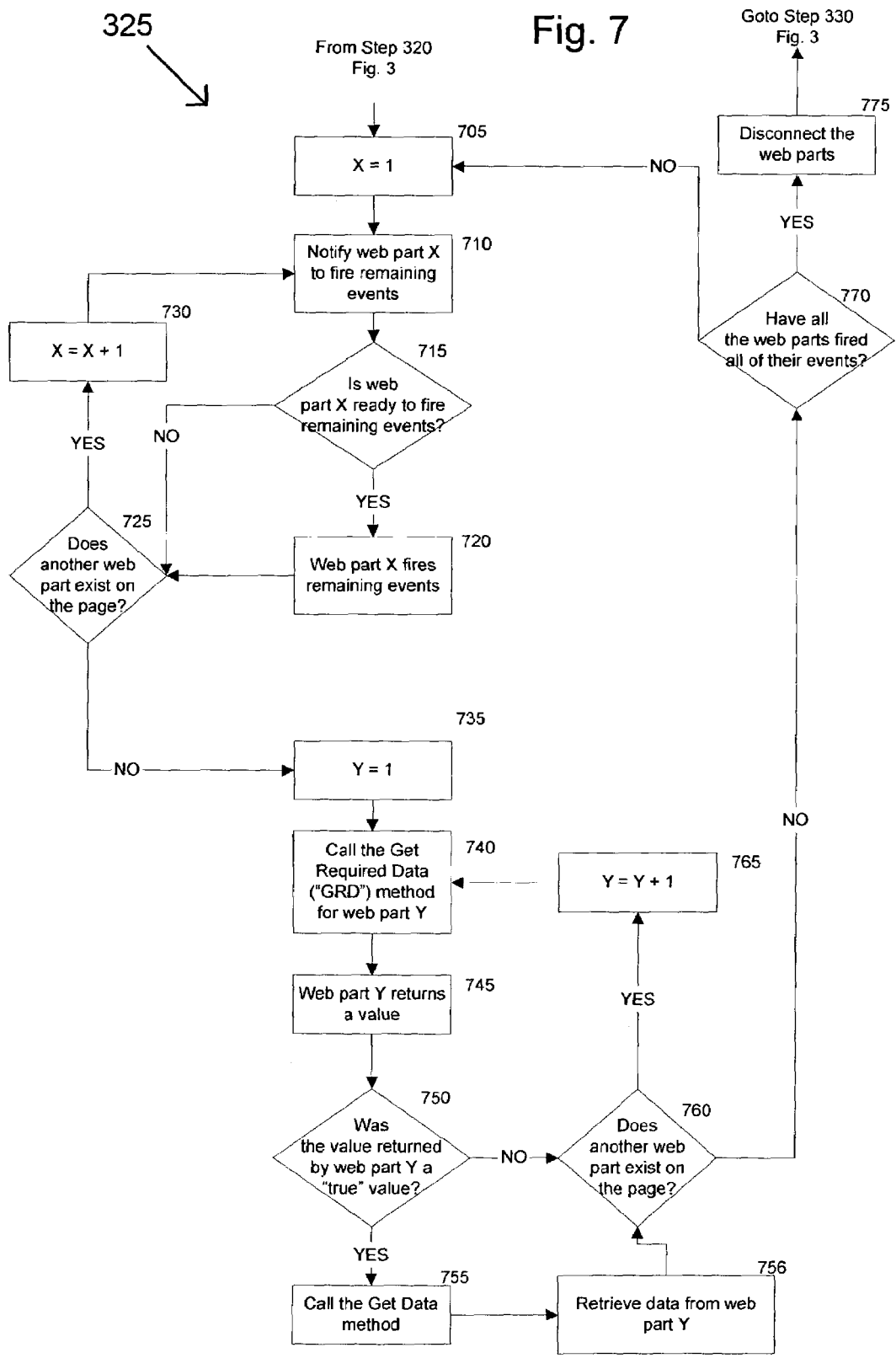
FIG. 7 is a flowchart illustrating a process for firing additional Web Part events and retrieving Web Part data in accordance with an exemplary embodiment of the present invention.

FIG. 7 is a logical flowchart diagram illustrating an exemplary computer-implemented method for firing additional events and retrieving Web Part data as completed by step 325 of FIG. 3. Now referring to FIGS. 1, 2, and 7, the exemplary method 325 begins with a counter variable, X, being set equal to one in step 705. In step 710, the WebPartPage object 250 notifies Web Part X to fire any remaining events of the Web Part. The connections object 210 informs the Web Parts to fire remaining events by calling a part communication main method. The part communication main method sends a signal from the connections object 210 to Web Parts on the server-side. Once the signal is received, the server side Web Parts fire non-initialization events ("main events"). The firing of the main events typically involve firing events which pass the data which is to be shared to connected Web Parts. For example, main events for a source Web Part containing cell data include an event which sends the value of the cell to the target Web Part. Main events for a source Web Part containing list data include an event which sends the data in the list to the target Web Part when the list has been modified. Once the data is passed to connected Web Parts, the Web Part typically does not send a return value to the connections object 210. A main event can include a pass data subroutine. The pass data subroutine can signal a source Web Part to pass a piece of data or a set of data from the source Web Part to the target Web Part. Once the source Web Part receives the signal from the pass data subroutine, the source Web Part can pass the data to the target Web Part.

In step 715, an inquiry is conducted to determine if Web Part X is ready to fire its remaining events. A Web Part is ready to fire its remaining events if the Web Part is not waiting for any information from another Web Part. If the Web Part is not ready to fire its remaining events, the "NO" branch is followed to step 725. Otherwise, the "YES" branch is followed to step 720, where Web Part X fires its remaining events. In one exemplary embodiment, once the event is fired, the Web Part keeps track of this fact in its state. The Web Part can then remember not to fire the same event in the next iteration of the part communication main loop.

In step 725, an inquiry is conducted to determine if another Web Part, which has not fired its remaining events, exists on the page. If so, the "YES" branch is followed to step 730, where the counter variable, X, is incremented by one. The process 325 returns to step 710 to notify the next Web Part to fire its remaining events. If all Web Parts have fired their remaining events, the "NO" branch is followed to step 735, where the counter variable, Y, is set equal to one.

In step 740, the Web Part object 205 calls the get required data method ("GRD") for Web Part Y. The GRD sends a signal to Web Part Y to determine if Web Part Y has received all of its shared data. Web Part Y sends a signal to the Web Part object 205 with a value of "true" if it has received all of its shared data, and a value of "false" if it has not. If Web Part Y has not received all of its shared data, the part communication main method remains active for Web Part Y, otherwise Web Part communication is ended between the connected Web Parts.

In step 750, an inquiry is conducted to determine if the value returned by Web Part Y is a "true" value. If not, the "NO" branch is followed to step 760. If the value returned by Web Part Y to the WebPartPage object 250 is a "true" value, the "YES" branch is followed to step 755, where the WebPartPage object 250 calls the get data method from Web Part Y. The get data method retrieves data from the Web Part Y, which can be shared with other connected Web Parts. In step 756, the WebPartPage object 250 retrieves data from Web Part Y.

In step 760, an inquiry is conducted to determine if another Web Part exists on the page. If so, the "YES" branch is followed to step 765, where the counter variable, Y, is incremented by one. The process 325 returns to step 740 to call the GRD method for the next Web Part. If no other Web Parts exist on the page, the "NO" branch is followed to step 770. In step 770, an inquiry is conducted to determine if all of the Web Parts have fired all of their events. If not, the "NO" branch returns to step 705, where the counter variable, X, is set equal to one. If all the Web Parts have fired all events, the "YES" branch is followed to step 775, where the WebPartPage object 250 disconnects the Web Parts. Once the Web Parts are disconnected, the Web Parts can no longer communicate with one another, even if previously connected. The process 325 continues to step 330 of FIG. 3.

Figure 8:
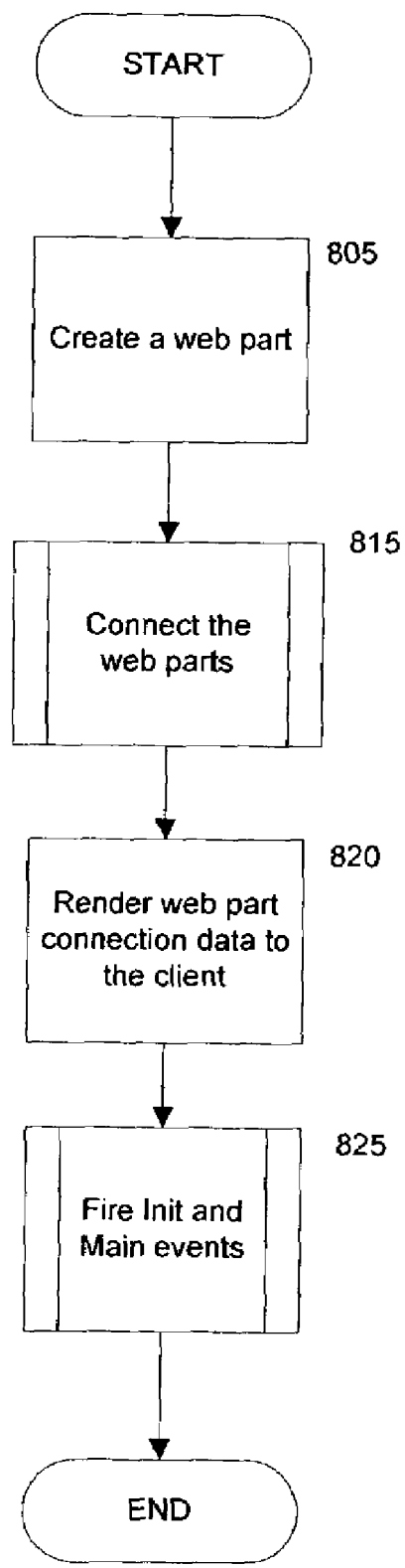
FIG. 8 is a flowchart illustrating a process for instantiating a Web Part so that information may be passed between the Web Parts on a client-side in accordance with an exemplary embodiment of the present invention.

FIG. 8 is a logical flowchart diagram presented to illustrate the general steps of an exemplary process 800 for generating and instantiating Web Parts in a document in the client-side environment 270 of FIG. 2. Now referring to FIGS. 1, 2, and 8, the exemplary method 800 begins with a Web Part creation phase in step 805. The Web Part creation phase typically includes a standard process used by ASP.Net and the Web Part connection program 138 for creating Web Parts.

An exemplary process for creating Web Parts typically includes retrieving a Web Part template from the WPC program 138. Next, data can be inserted into the template, the data corresponding to the data to be contained in the Web Part. A reference to subroutines in the WPC program 138 is added to the Web Part template. An output path, designating where the Web Part will be located on a web page, is inserted into the Web Part template. A name and version number for the Web Part can be inserted into the Web Part template. Code is written which defines the rendering of the Web Part. Finally, a "build Web Part" option can be selected from the Web Part template to build the Web Part.

During the exemplary Web Part creation phase of step 805, each Web Part is loaded onto a page and the data for each Web Part is retrieved from the Web Part object 205. Additionally, the initialization events for ASP.net are fired and the view states for each Web Part are loaded into the server 149. The Web Part creation phase of step 805 is substantially similar to step 310 of FIG. 3.

In step 815, the connections object 210 connects the Web Parts during the Web Part connection phase. The Web Parts are rendered to the client 270 by the WebPartPage object 250 in step 820. The ASP.net performs its pre-rendering routines. The state of the Web Parts is saved on the server 149. The Web Parts are rendered to the Web Part service component 225 on the client 270. In one exemplary embodiment, the Web Part sends the Web Part service component 225 the necessary code for the Web Part to run on the client 270. In step 825, the connected Web Parts fire their initialization arguments and additional events. The process 800 continues to the END step.

Figure 9:
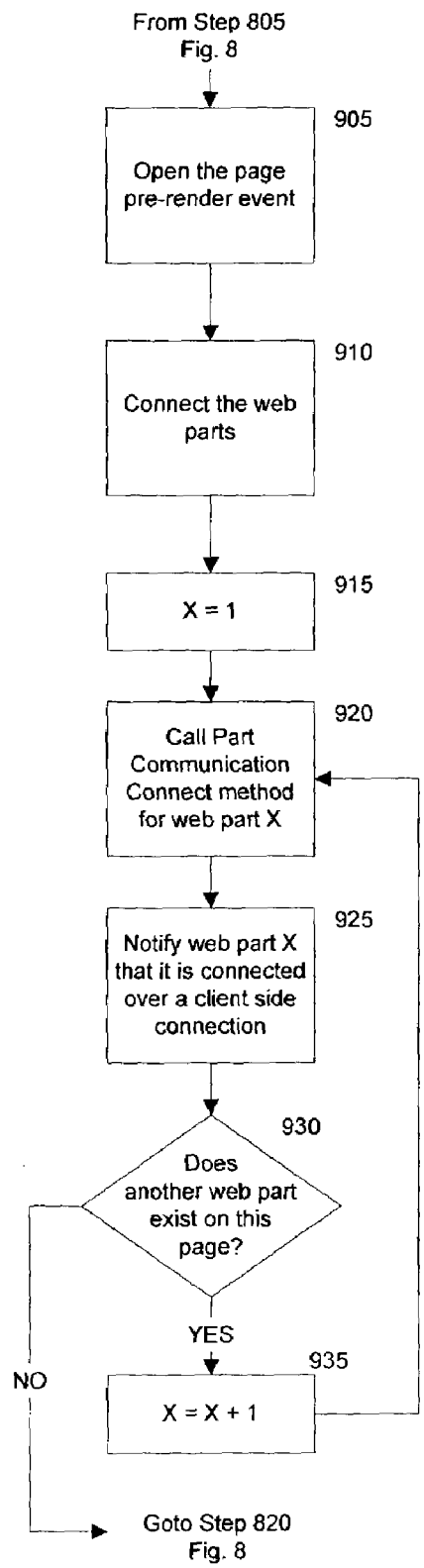
FIG. 9 is a flowchart illustrating a process for connecting Web Parts to selected records on the client-side in accordance with an exemplary embodiment of the present invention.

FIG. 9 is a logical flowchart diagram illustrating an exemplary computer-implemented method for connecting Web Parts so that data may be passed between the connected Web Parts, as completed by step 815 of FIG. 8. Now referring to FIGS. 1, 2, and 9, the exemplary method 815 begins with the WebPartPage object 250 opening the page pre-render event for the Web Part in step 905. In one exemplary embodiment, the WebPartPage object 250 hooks into the page pre-render event before another pre-render event is called for a Web Part. In step 910, the Web Parts are connected. The connections object 210 typically connects the Web Parts after receiving the Web Parts from the Web Part object 205.

A counter variable, X, is set equal to one in step 915. In step 920, the WebPartPage object 250 calls the part communication connect method for Web Part X. The part communication connect method informs the Web Parts that they are connected by a specific interface by passing both ends of the connection information about which interface is connected, which Web Part it is connected to, which interface on that other Web Part it is connected to, and whether the connection should run on the server-side or the client-side. The Web Part does not typically send a return value. In one exemplary embodiment, the part communication connect method is only called once for each of the connected Web Parts.

The WebPartPage object 250 notifies Web Part X that Web Part X is connected over a client side connection in step 925. The WebPartPage object 250 also informs Web Part X of the specific interface that connects Web Part X to another Web Part. In step 930, an inquiry is conducted to determine if another Web Part exists on the page. If so, the "YES" branch is followed to step 935, where the counter variable, X, is incremented by one. The process 815 returns to step 920 to call the part communication connect method for the next Web Part. If no other Web Part exists on the page, the "NO" branch is followed to step 820 of FIG. 8.

Figure 10:
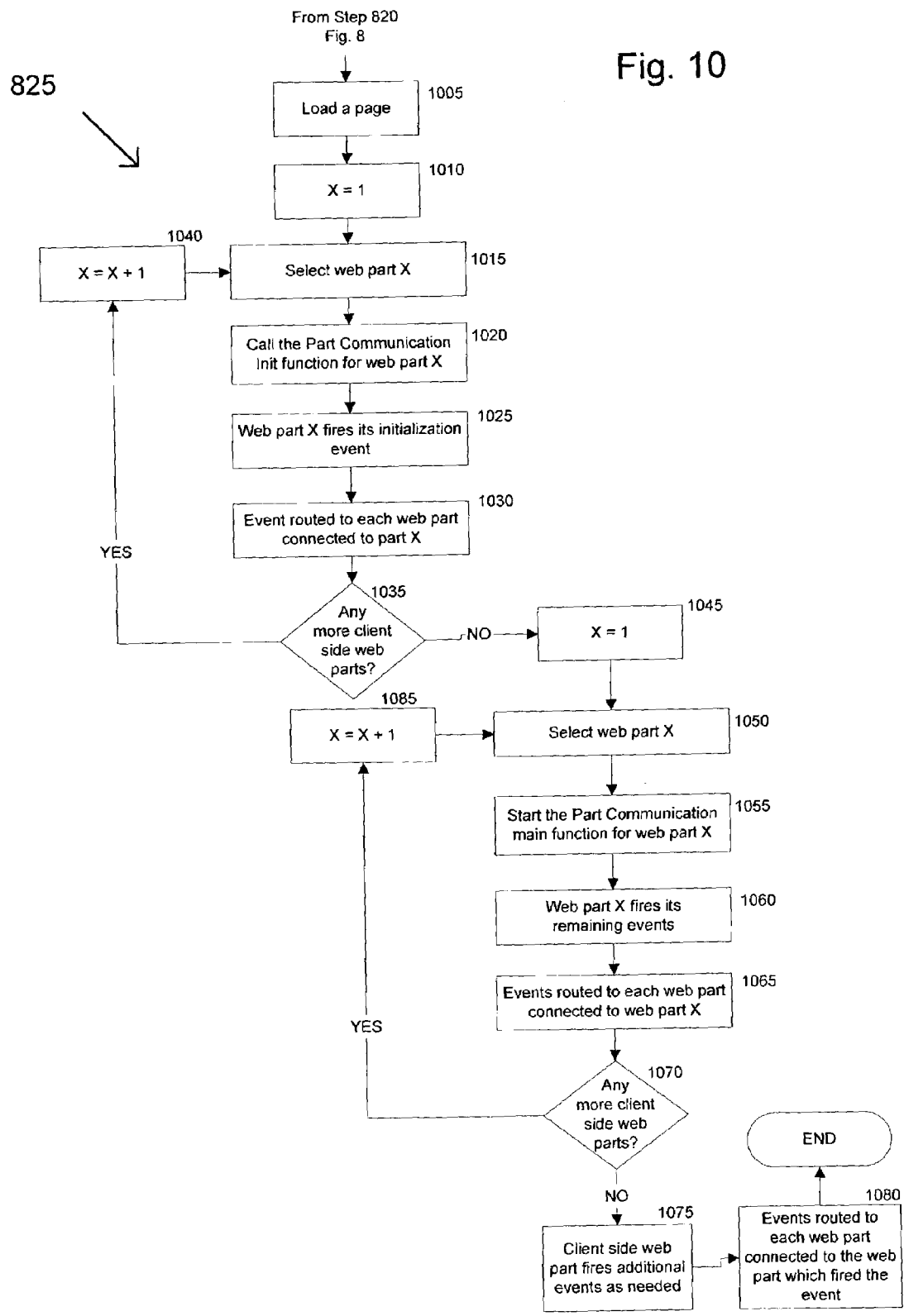
FIG. 10 is a flowchart illustrating a process for instructing Web Parts to fire initialization events and additional events on the client in accordance with an exemplary embodiment of the present invention.

FIG. 10 is a logical flowchart diagram illustrating an exemplary computer-implemented method for firing the initialization events and additional events of a Web Part on a client 270 as completed by step 825 of FIG. 8. Referencing FIGS. 1, 2, and 10, the exemplary method 825 begins with the Web Parts being loaded onto a page on the client 270 in step 1005. Counter variable, X, is set equal to one in step 1010.

In step 1015, Web Part X is selected by the WebPartPage object 250. The connections object 210 induces the Web Parts to fire initialization events by calling the part communication init method. The part communication init method is accomplished by the connections object 210 sending a signal to each connected Web Part. The connected Web Parts then fire events with an identifier having the file extension or suffix "init." Typically, the connected Web Parts do not send a return value to the connections object 210. In one exemplary embodiment, the part communication init method is called once for each Web Part connected to another Web Part over a client-side connection. In one exemplary embodiment, an initialization event is any event whose method name includes a file extension or suffix "init." The initialization event passes various Web Part initialization parameters to the connected Web Parts, including the type of data which will be passed between the connected Web Parts. The data types can include fields lists, rows, and cells. In step 1025, Web Part X fires its initialization event. The initialization event passes various Web Part initialization parameters to the WebPartPage object 250. The connections object 210 routes the initialization event to each Web Part connected to Web Part X in step 1030.

In step 1035, an inquiry is conducted to determine if additional Web Parts reside on the client 270. If so, the "YES" branch is followed to step 1040, where the counter variable, X, is incremented by one. The process 825 returns to step 1015 to select the next Web Part. If no additional Web Parts exist on the client 270, the "NO" branch is followed to step 1045, where the counter variable, X, is set equal to one.

In step 1050, the WebPartPage object 250 selects Web Part X. The connections object 210 informs the Web Parts to fire remaining events by calling the part communication main method. The part communication main method sends a signal from the connections object 210 to the Web Parts. Once the signal is received, the Web Parts fire non-initialization events ("main events"). The firing of the main events typically involve firing events which pass the data which is to be shared to connected Web Parts. For example, main events for a source Web Part containing cell data include an event which sends the value of the cell to the target Web Part. The part communication method is received at the source Web Part containing a cell. The part communication method signals the Web Part to fire main events. The source Web Part containing a cell fires its main event, sending the contents of the cell to the target Web Part. In one exemplary embodiment, Web Parts can contain multiple main events. Once the data is passed to connected Web Parts, the Web Part typically does not send a return value to the connections object 210. In step 1060, Web Part X fires its additional events to all connected Web Parts. The WebPartPage object 250 routes the fired additional events to each Web Part connected to Web Part X in step 1065. For example, a main event can include a pass data subroutine. The pass data subroutine can signal a source Web Part to pass a piece of data or a set of data from the source Web Part to the target Web Part. Once the source Web Part receives the signal from the pass data subroutine, the source Web Part can pass the data to the target Web Part.

In step 1070, an inquiry is conducted to determine if any additional Web Parts on the server 149 have not fired their additional events. If so, the "YES" branch is followed to step 1085, where the counter variable, X, is incremented by one. The process 825 returns to step 1050 for the selection of the next Web Part. If all Web Parts on the server 149 have fired their additional events, the "NO" branch is followed to step 1075, where all Web Parts on the client 270 fire additional events as needed. The Web Part server component 225 routes the fired events to each Web Part connected to the Web Part on the client 270 that fired the event in step 1080. The process 825 continues to the END step.

FIG. 11 is a logical flowchart diagram illustrating an exemplary computer-implemented method for connecting Web Parts having a hyperlink across more than one page as completed by step 315a of FIG. 11. Referencing FIGS. 1, 2, and 11, the exemplary method 315a begins with the user selecting a data record from a source Web Part on a source page with the mouse 142 in step 1105. The source Web Part is the Web Part that will send data to one or more target Web Parts when the Web Parts are connected. The source page is the page from which data will be sent and a target page will receive the data from the source page. In one exemplary embodiment, the data record in the source Web Part contains an embedded hyperlink to a page other than the source page.

In step 1120, an inquiry is conducted to determine if the Web Parts will be connected on the client 270 or server 149. Web Parts are connected on the client 270 or the server 149 if the target Web Part is on the client 270 or the server 149. If the Web Part will be connected on the client 270, the "Client" branch is followed to step 1115, where the user is informed that a cross page connection cannot be completed. Otherwise, the "Server" branch is followed to step 1125, where the Web Part connection program 138 passes a URL that was embedded in the selected data record, to the target page.

In step 1130, the cross page target object 215 receives the URL from the source page. The cross page target object 215 parses a query string from the URL in step 1135. The query string typically includes the target Web Part, the interface used by the target Web Part, and an event subroutine to generate an action from the target Web Part. In step 1140, the cross page target object 215 determines the target Web Part, the interface, and an event from the query string. The cross page target object 215 passes the event to the target Web Part in step 1145. At this point the source Web Part and the target Web Part are connected and the target Web Part has been informed of the connection and the interface type used to complete the connection. The process 315a continues to step 320 of FIG. 3.

FIG. 12 is a logical flowchart diagram illustrating an exemplary computer-implemented method for connecting Web Parts across more than one page as completed by step 315b of FIG. 12. Referencing FIGS. 1, 2, and 12, the exemplary method 315b begins with the user selecting a data point from a source Web Part on a source page in step 1205. The source Web Part is the Web Part that will send data to a target Web Part when the Web Parts are connected. The source page is the page from which data will be sent and a target page will receive the data from the source page.

In step 1220, an inquiry is conducted to determine if the Web Parts will be connected on the client 270 or server 149. Web Parts are connected on the client 270 or the server 149 if the target Web Part is on the client 270 or the server 149. If the Web Parts will be connected on the client 270, the "Client" branch is followed to step 1215, where the user is informed that a cross page connection cannot be completed. In one exemplary embodiment, connections which are formed on the client side will not be allowed to go cross page. Otherwise, the "Server" branch is followed to step 1230 where the cross page source object 230 saves the target page URL, target page identifier, and the interface name in the source Web Part on the source page.

In step 1235, an inquiry is conducted to determine if the interface saved on the source Web Part is run on the client 270 or the server 149. If the interface is run on the server, the "Server" branch is followed to step 1240, where cross page source object 230 renders code to the target page to redirect the target page using a URL and query string. Otherwise, the "Client" branch is followed to step 1215, where the user is informed that a cross page connection cannot be completed.

In step 1260, the cross page target object 215 receives the URL and the query string from the event handler on the source page. The cross page target object 215 parses the query string from the URL in step 1265. In step 1270, the cross page target object 215 determines the target Web Part, the interface, and an event from the query string. The cross page target object 215 passes the event to the target Web Part in step 1275. At this point the source Web Part and the target Web Part are connected and the target Web Part has been informed of the fact that it is connected and the interface type used to complete the connection. The process 315b continues to step 320 of FIG. 3.

In conclusion, the present invention supports a computer-implemented method and architecture for Web Parts to connect and pass data between one another. The Web Part connection framework can generate a Web Part and provide a series of interfaces to connect the Web Part to other compatible Web Parts. Once connected, the Web Part connection framework can signal a source Web Part to send or share data with a target Web Part. The Web Parts connection framework provides the ability to connect Web Parts located on a server or a client. The Web Parts connection framework further provides the ability to connect Web Parts located on different pages.

It will be appreciated that the present invention fulfills the needs of the prior art described herein and meets the above-stated objectives. While there have been shown and described several exemplary embodiments of the present invention, it will be evident to those skilled in the art that various modifications and changes may be made thereto without departing from the spirit and the scope of the present invention as set forth in the appended claims and equivalence thereof.

We claim:

1. A computer-implemented method for connecting Web Parts comprising the steps of:
   - accepting a first Web Part and a second Web Part;
   - creating a connection between the first Web Part and the second Web Part, wherein the connection provides a communication path for passing data between the first Web Part and the second Web Part;
   - determining the compatibility of a first interface associated with the first Web Part and a second interface associated with the second Web Part;
   - if the interfaces are not compatible, then inserting a transformer between the connected incompatible interfaces to provide compatibility between the first and second Web Parts, the transformer generating a code to the connected incompatible Web Parts to define how a data type in the first Web Part is converted to a data type in the second Web Part or to define how a data type in the second Web Part is converted to a data type in the first Web Part;
   - initiating a pass data subroutine in the first Web Part, wherein the pass data subroutine signals the first Web Part to pass a first set of data from the first Web Part to the connected second Web Part;
   - retrieving the first set of data from the first Web Part; and
   - passing the first set of data to the second Web Part.

2. The computer-implemented method of claim 1 further comprising the step of receiving a postback comprising the first set of data in the first Web Part.

3. The computer-implemented method of claim 1 further comprising the step of rendering the second Web Part containing the first set of data.

4. The computer-implemented method of claim 1 further comprising the steps of:
   - firing a data parameters subroutine for the first Web Part; and
   - retrieving a first set of parameters for a first set of data from the first Web Part, wherein the first set of parameters designates the type of data which will be sent from the first Web Part to the second Web Part.

5. The computer-implemented method of claim 4, wherein the step of firing a data parameters subroutine in the first Web Part comprises:
   - (a) signaling the first Web Part to fire the data parameters subroutine;
   - (b) firing the data parameters subroutine for the first Web Part;
   - (c) sending a first set of parameters to the connected second Web Part; and
   - (d) repeating steps a-c for the second Web Part.

6. The computer-implemented method of claim 1, wherein the step of retrieving a first set of data from the first Web Part comprises:
   - (a) determining if the first Web Part is prepared to send the first set of data from the first Web Part, whereby the first Web Part is prepared to send the first set of data when the first Web Part has fired the data parameters subroutine and the pass data subroutine;
   - (b) retrieving the first set of data from the first Web Part based on a positive determination that the first Web Part is prepared to send the first set of data; and
   - (c) repeating steps a-b for each of a plurality of Web Parts.

7. The computer-implemented method of claim 6 further comprising the steps of:
   - signaling the first Web Part to send the first set of data; and
   - receiving a response from the first Web Part, wherein the response determines if the first Web Part is prepared to send the first set of data.

8. The computer implemented method of claim 1, wherein the step of firing a pass data subroutine further comprises:
   - (a) signaling the first Web Part to fire the pass data subroutine;
   - (b) firing the pass data subroutine for the first Web Part; and
   - (c) repeating steps a-b for the second Web Part.

9. The computer-implemented method of claim 1, wherein the step of connecting the first Web Part to the second Web Part comprises:
   - (a) retrieving the first interface from the first Web Part;
   - (b) retrieving the second interface from the second Web Part;
   - (c) connecting the first interface to the second interface, whereby connecting the interfaces generates a connection between the Web Part;
   - (d) signaling the first Web Part that the first Web Part is connected to the second Web Part; and
   - (e) repeating steps a-d for each of the plurality of Web Parts which are connected to an other Web Part.

10. The computer-implemented method of claim 8, wherein the first Web Part and the second Web Part are connected over a server-side connection.

11. A computer-readable medium having computer-executable instructions for performing the steps recited in claim 1.

12. A computer-implemented method for connecting Web Parts over a client-side connection comprising the steps of:
   accepting a first Web Part and a second Web Part via the client-side connection, wherein the first Web Part comprises a first data set which will be passed to the second Web Part;
   creating a connection between the first Web Part and the second Web Part, wherein the connection provides a communication path for passing the first data set between the first Web Part and the second Web Part;
   determining the compatibility of a first interface associated with the first Web Part and a second interface associated with the second Web Part;
   if the interfaces are not compatible, then inserting a transformer between the connected incompatible interfaces to provide compatibility between the first and second Web Parts, the transformer generating a code to the connected incompatible Web Parts to define how a data type in the first Web Part is converted to a data type in the second Web Part or to define how a data type in the second Web Part is converted to a data type in the first Web Part;
   rendering the first Web Part and the second Web Part to a client system via the client side connection;
   initiating a pass data subroutine in the first Web Part, wherein the pass data subroutine signals the first Web Part to pass the first data set from the first Web Part to the connected second Web Part via the client side connection;
   retrieving the first data set from the first Web Part; and
   passing the first data set to the second Web Part via the client-side connection.

13. The computer-implemented method of claim 12, wherein the step of creating a connection between the first Web Part and the second Web Part comprises:
   (a) firing a part connection subroutine in the first Web Part and the second Web Part, wherein the subroutine retrieves connection information from the first and second Web Parts;
   (b) retrieving the first interface from the first Web Part;
   (c) retrieving the second interface from the second Web Part;
   (d) connecting the first interface to the second interface via the client-side connection, whereby connecting the interfaces generates a connection between the Web Parts;
   (e) signaling the first Web Part that the first Web Part is connected to the second Web Part; and
   (f) repeating steps a-e for each of the plurality of Web Parts connected to the first Web Part.

14. The computer-implemented method of claim 12 further comprising the step of initiating a data parameters subroutine in the first Web Part to determine the type of data in the first data set being sent from the first Web Part to the second Web Part.

15. The computer-implemented method of claim 14, wherein the step of initiating a data parameters subroutine in the first Web Part comprises:
   (a) calling a data parameters method for the first Web Part to induce the first Web Part to fire the data parameters subroutine;
   (b) firing the data parameters subroutine for the first Web Part;
   (c) retrieving a first data parameter set from the first Web Part;
   (d) sending the first data parameter set to the second Web Part; and
   (e) repeating steps a-d for the second Web Part.

16. The computer-implemented method of claim 12 further comprising the step of sending a page to a client system comprising the second Web Part comprising the first data set.

17. The computer-implemented method of claim 12, wherein the step of initiating a pass data subroutine in the first Web Part comprises:
   (a) calling the pass data subroutine for the first Web Part to induce the first Web Part to fire the pass data subroutine;
   (b) firing the pass data subroutine for the first Web Part in response to the call;
   (c) receiving the first data set from the first Web Part in response to the firing of the pass data subroutine;
   (d) sending the first data set to the second Web Part; and
   (e) repeating steps a-d for the second Web Part.

18. The computer-implemented method of claim 12, further comprising the steps of:
   signaling a first client-side Web Part to commence pass data subroutine via the client-side connection;
   firing the pass data subroutine for the first client-side Web Part;
   receiving the first data set from the first client-side Web Part via the client-side connection; and
   sending the first data set to the second Web Part.

19. The computer implemented method of claim 18, wherein the second Web Part is a client-side Web Part.

20. A computer-readable medium having computer-executable instructions for performing the steps recited in claim 12.

21. A computer-implemented method for passing data from a first Web Part on a source page to a second Web Part on a target page comprising the steps of:
   receiving a data set from a first Web Part on a source page, the data set comprising a hyperlink, having a query string containing the name and interface of a second Web Part on a target page;
   determining whether the first and second Web Parts will be connected on a client or server computer;
   if it is determined that the Web Parts will be connected on a client computer, then determining that a cross page connection will not be completed, the cross page connection being made by a cross page source object which facilitates the communication of the data set without the need for physical hyperlinks in the source page;
   if it is determined that the Web Parts will not be connected on a client computer, then sending the hyperlink to the target page comprising the second Web Part;
   parsing the query string from the hyperlink to determine the name and the interface of the second Web Part;
   identifying the second Web Part on the target page from the name and interface parsed from the query string; and
   sending the data set from the first Web Part to the second Web Part.

22. The computer-implemented method of claim 21, wherein the first Web Part and the second Web Part are on different pages.

23. A computer-implemented method for passing data from a first Web Part on a source page to a second Web Part on a target page comprising the steps of:

receiving a first Web Part and a second Web Part, wherein the first Web Part is on a source page and the second Web Part is on a target page;

storing a uniform resource locator ("URL") and a query string for the target page in the first Web Part, wherein the URL designates a page to which a data set will be passed from the first Web Part and the query string comprises a name and interface of the second Web Part on the target page;

determining whether the first and second Web Parts will be connected on a client or server computer;

if it is determined that the Web Parts will be connected on a client computer, then determining that a cross page connection will not be completed, the cross page connection being made by a cross page source object which facilitates the communication of the data set without the need for physical hyperlinks in the source page;

if it is determined that the Web Parts will not be connected on a client computer, then parsing the query string to determine the name and interface of the second Web Part;

receiving the data set from the first Web Part on the source page; and sending the data set to the second Web Part on the target page based on the name and interface retrieved by parsing the query string.

* * * * *